United States Patent
Soubeyran et al.

(10) Patent No.: US 12,182,168 B2
(45) Date of Patent: Dec. 31, 2024

(54) COST ATTRIBUTION USING RESOURCE SWITCHING

(71) Applicant: SIGMA COMPUTING, INC., San Francisco, CA (US)

(72) Inventors: Samuel Andre Abraham Soubeyran, Mountain View, CA (US); Jack S. Qian, San Francisco, CA (US); Prashant Soral, Redwood City, CA (US); Samantha C. Watts, Berkeley, CA (US); Zalak H. Trivedi, San Leandro, CA (US); James A. Johnson, Concord, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 103 days.

(21) Appl. No.: 18/189,921

(22) Filed: Mar. 24, 2023

(65) Prior Publication Data

US 2024/0320238 A1    Sep. 26, 2024

(51) Int. Cl.
  *G06F 16/00*   (2019.01)
  *G06F 16/248*  (2019.01)
  *G06F 16/28*   (2019.01)
  *G06F 40/18*   (2020.01)

(52) U.S. Cl.
  CPC .......... *G06F 16/283* (2019.01); *G06F 16/248* (2019.01); *G06F 40/18* (2020.01)

(58) Field of Classification Search
  CPC ....... G06F 16/283; G06F 16/248; G06F 40/18
  See application file for complete search history.

(56) References Cited

U.S. PATENT DOCUMENTS

| | | | |
|---|---|---|---|
| 8,667,399 B1 | 3/2014 | Brandwine et al. | |
| 10,997,556 B2 | 5/2021 | Scott et al. | |
| 2024/0037095 A1* | 2/2024 | Seiden | G06F 16/283 |

OTHER PUBLICATIONS

Attasena et al., "fVSS: A New Secure and Cost-Efficient Scheme for Cloud Data Warehouses," ACM, DOLAP'14, Nov. 7, 2014, pp. 81-90. (Year: 2014).*
Ahmadian et al., "Information Leakage in Cloud Data Warehouses," IEEE Transactions on Sustainable Computing, vol. 4, No. 2, Apr.-Jun. 2020, pp. 192-203. (Year: 2020).*
International Search Report and Written Opinion, PCT/US2024/020888, Jun. 7, 2024, 13 pages.

* cited by examiner

*Primary Examiner* — Cheryl Lewis

(57) ABSTRACT

Cost attribution using resource switching including receiving, by a workbook manager from a first client computing system, a first request for a workbook presenting a dataset from a cloud-based data warehouse, wherein the first request comprises a first user attribute; selecting, by the workbook manager, a first resource warehouse on the cloud-based data warehouse based on the first user attribute, wherein the first resource warehouse tracks resources used to service data requests on the cloud-based data warehouse; retrieving, by the workbook manager, the dataset from the cloud-based data warehouse using the first resource warehouse matched to the first user attribute; and presenting, on the first client computing system by the workbook manager, the workbook presenting the dataset.

20 Claims, 6 Drawing Sheets

COST ATTRIBUTION USING RESOURCE SWITCHING

BACKGROUND

Field of the Invention

The field of the invention is data processing, or, more specifically, methods, apparatus, and products for cost attribution using resource switching.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for cost attribution using resource switching including receiving, by a workbook manager from a first client computing system, a first request for a workbook presenting a dataset from a cloud-based data warehouse, wherein the first request comprises a first user attribute; selecting, by the workbook manager, a first resource warehouse on the cloud-based data warehouse based on the first user attribute, wherein the first resource warehouse tracks resources used to service data requests on the cloud-based data warehouse; retrieving, by the workbook manager, the dataset from the cloud-based data warehouse using the first resource warehouse matched to the first user attribute; and presenting, on the first client computing system by the workbook manager, the workbook presenting the dataset.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
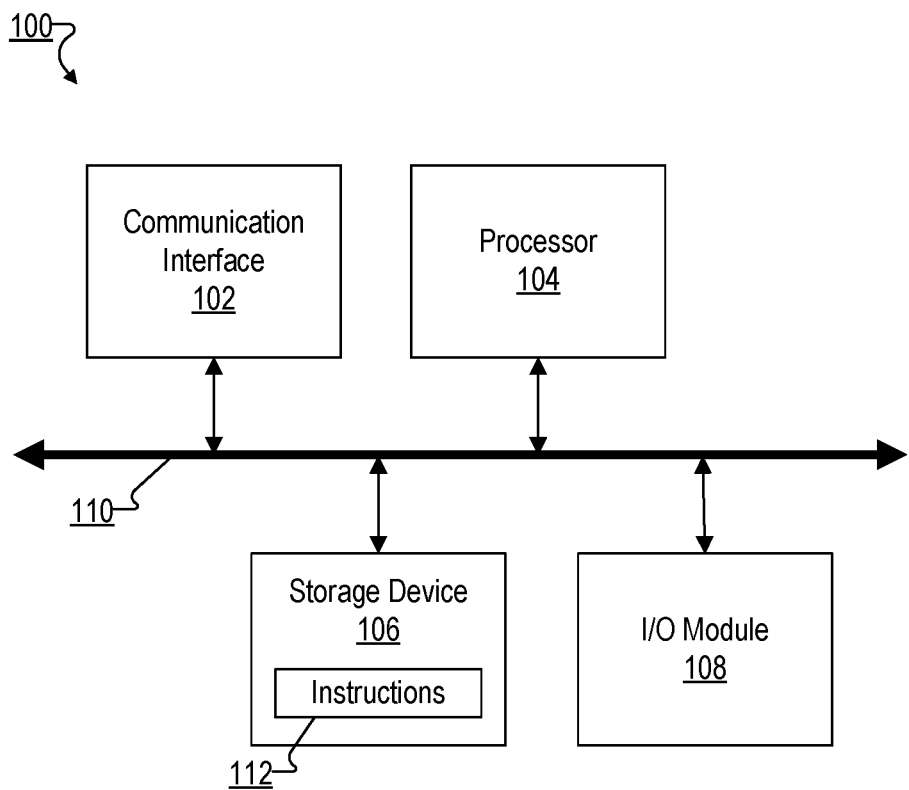
FIG. 1 sets forth a block diagram of an example system configured for cost attribution using resource switching according to embodiments of the present invention.

Example methods, apparatus, and products for cost attribution using resource switching in accordance with embodiments of the present disclosure are described with reference to the accompanying drawings, beginning with FIG. 1. FIG. 1 illustrates an exemplary computing device 100 that may be specifically configured to perform one or more of the processes described herein. As shown in FIG. 1, computing device 100 may include a communication interface 102, a processor 104, a storage device 106, and an input/output ("I/O") module 108 communicatively connected one to another via a communication infrastructure 110. While an exemplary computing device 100 is shown in FIG. 1, the components illustrated in FIG. 1 are not intended to be limiting. Additional or alternative components may be used in other embodiments. Components of computing device 100 shown in FIG. 1 will now be described in additional detail.

Communication interface 102 may be configured to communicate with one or more computing devices. Examples of communication interface 102 include, without limitation, a wired network interface (such as a network interface card), a wireless network interface (such as a wireless network interface card), a modem, an audio/video connection, and any other suitable interface.

Processor 104 generally represents any type or form of processing unit capable of processing data and/or interpreting, executing, and/or directing execution of one or more of the instructions, processes, and/or operations described herein. Processor 104 may perform operations by executing computer-executable instructions 112 (e.g., an application, software, code, and/or other executable data instance) stored in storage device 106.

Storage device 106 may include one or more data storage media, devices, or configurations and may employ any type, form, and combination of data storage media and/or device. For example, storage device 106 may include, but is not limited to, any combination of non-volatile media and/or volatile media. Electronic data, including data described herein, may be temporarily and/or permanently stored in storage device 106. For example, data representative of computer-executable instructions 112 configured to direct processor 104 to perform any of the operations described herein may be stored within storage device 106. In some examples, data may be arranged in one or more databases residing within storage device 106.

I/O module 108 may include one or more I/O modules configured to receive user input and provide user output. I/O module 108 may include any hardware, firmware, software, or combination thereof supportive of input and output capabilities. For example, I/O module 108 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 108 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 108 is configured to provide graphical data to a display for presentation to a user. The graphical data may be representative of one or more graphical user interfaces and/or any other graphical content as may serve a particular implementation. In some examples, any of the systems, computing devices, and/or other components described herein may be implemented by computing device 100.

Figure 2:
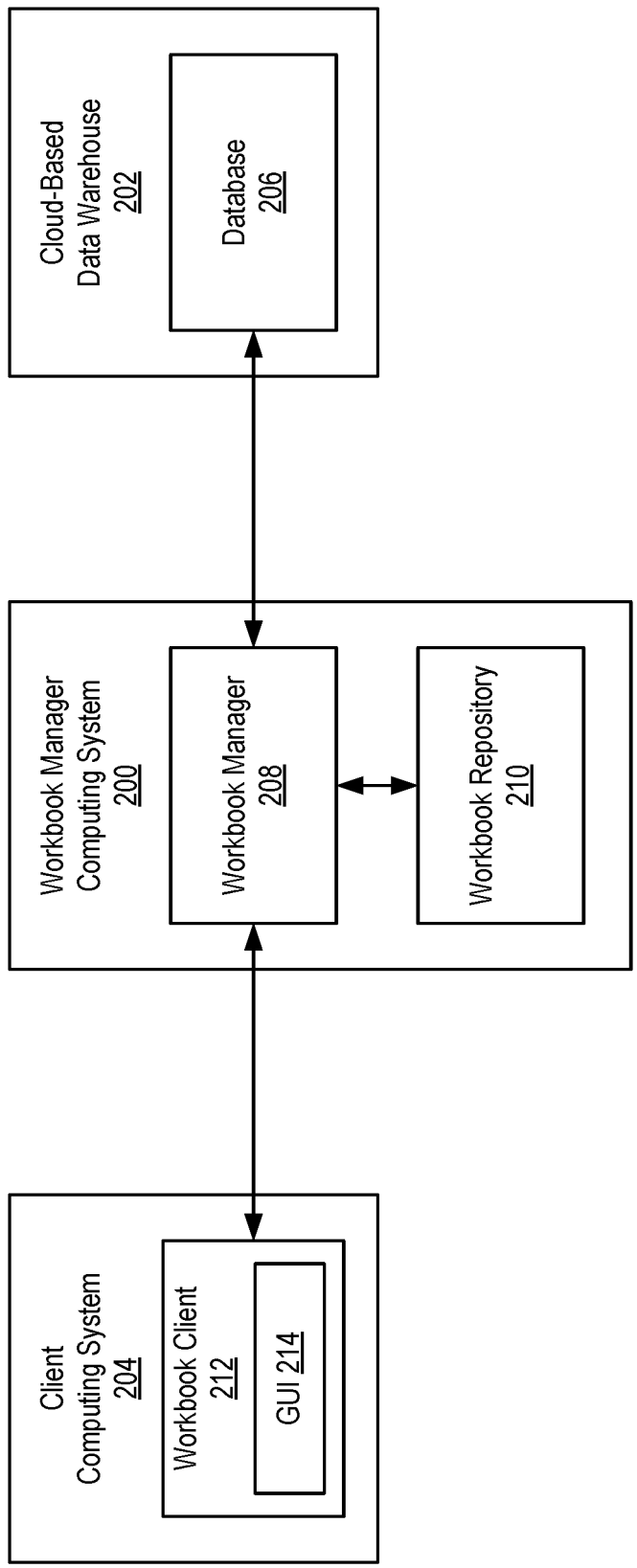
FIG. 2 sets forth a block diagram of an example system configured for cost attribution using resource switching according to embodiments of the present invention.

For further explanation, FIG. 2 illustrates a block diagram depicting an exemplary system for cost attribution using resource switching according to embodiments of the present invention. As shown in FIG. 2, the system includes a workbook manager computing system 200, a cloud-based data warehouse 202, and a client computing system 204. The workbook manager computing system 200 includes a workbook manager 208 and a workbook repository 210. The client computing system 204 includes a workbook client 212 with a graphical user interface (GUI) 214. The cloud-based data warehouse 202 includes a database 206.

The workbook manager 208 is hardware, software, or an aggregation of hardware and software configured to present a dataset within a workbook on a client computing system 204 via the workbook client 212. The workbook manager 208 uses the dataset to retrieve data from the database 206 by issuing a database statement to the cloud-based data warehouse 202 requesting the data. In response, the cloud-based data warehouse 202 sends query results including the data to the workbook manager 208. Once the query results are received, the data is then organized according to the dataset and workbook metadata to generate the workbook. The workbook is then sent to a workbook client 212 on the client computing system 204 for presentation to a user. The workbook manager 208 may reside on the workbook manager computing system 200, which is an intermediary computing system between each client computing system and the cloud-based data warehouse 202.

The cloud-based data warehouse 202 stores and manages data on behalf of a data tenant. A data tenant is an entity that controls data on the cloud-based data warehouse. The user (e.g., via the client computing system 204) accesses the data via the workbook manager 208, which organizes and analyzes the data as datasets within a workbook. The user may be within the same organization as the data tenant (e.g., an employee of the company that owns and stores the data) or may be in a business relationship with the data tenant (e.g., an employee of a company that employs the data tenant for an enterprise service). The workbook manager 208 may access the data from the cloud-based data warehouse 202 using credentials supplied by the data tenant.

A workbook is a presentation of data from a cloud-based data warehouse 202. A workbook may include one or more workbook elements. Each workbook element includes a collection of graphical elements and organizing mechanism for a dataset or portion of a dataset. Workbooks may be stored in the workbook repository 210. Workbooks are described in further detail below.

To present data from the cloud-based data warehouse 202, the data is retrieved from the database 206 (e.g., using a database statement) and organized using a dataset. A dataset is an organizing mechanism for data and resides on the workbook manager computing system 200. The dataset may also include instructions for the retrieval of data from the cloud-based data warehouse 202. The dataset may include, for example, a network location of the cloud-based data warehouse 202, a structure in which to organize the data, and formulas or other data points to be included with the data. When the workbook is being presented, the dataset also includes the data retrieved from the cloud-based data warehouse.

The workbook client 212 is a part of the workbook manager 208 and works in concert with the workbook manager 208 to present a workbook on a client computing system 204. The workbook client 212 may perform local processing of changes made to the workbook and/or the dataset. The workbook client 212 may be an application executing within a web browser. The workbook client 212 may be part of an Internet application that includes the workbook manager 208 and is hosted on the workbook manager computing system 200.

The GUI 214 is a visual presentation configured to present workbooks to a client. The GUI 214 may present a mechanism by which a user can manipulate and effect change to the workbook in the form of a workbook edit. The GUI 214 may be displayed on client computing system 204 (e.g., on a system display or mobile touchscreen).

The database 206 is a collection of data and a management system for the data. Data may be organized into columns and rows (also referred to as records). The particular columns, rows, and organization of the columns and rows that make up data may be specified in the database statement requesting the data. Data may be sent from the cloud-based data warehouse 202 in response to a database statement (also referred to as a query). Accordingly, data retrieved in response to a database statement may be referred to as query results. The database statement may be a structured query language statement.

The workbook manager 208 and workbook clients 212$a$, 212$b$ may exchange information using state specifications. A state specification is a collection of data describing inputs into the GUI 214. The state specification may include manipulations of GUI elements within the GUI 214 along with data entered into the GUI 214 by a user of the client computing system 204. Such manipulations and data may indicate requests for and manipulations of data and or workbooks. Such manipulations and data may also indicate requests to edit an existing row or create a new row and values for that row. The state specification may be a standard file format used to exchange data in asynchronous browser-server communication. For example, the state specification may be a JavaScript Object Notation specification. The state specification may also include descriptions of elements that are used to apply changes to the data and/or workbooks. Such elements may include filters applied to an element of the workbook, the hierarchical level of an element of the workbook, joins performed within an element of the workbook, exposable parameters in an element of the workbook, and security for the workbook.

The workbook manager 208 may use the state specification as input to compile a database statement. This database statement generation process may include a number of intermediate forms. For example, the database statement generation process may begin with state specification being converted into an abstract syntax tree. The abstract syntax tree may then be canonicalized into a canonicalized hierarchy. The canonicalized hierarchy may then be linearized into the workbook algebra. The workbook algebra may then be lowered into a relational algebra, which may then be lowered into the database statement.

Figure 3:
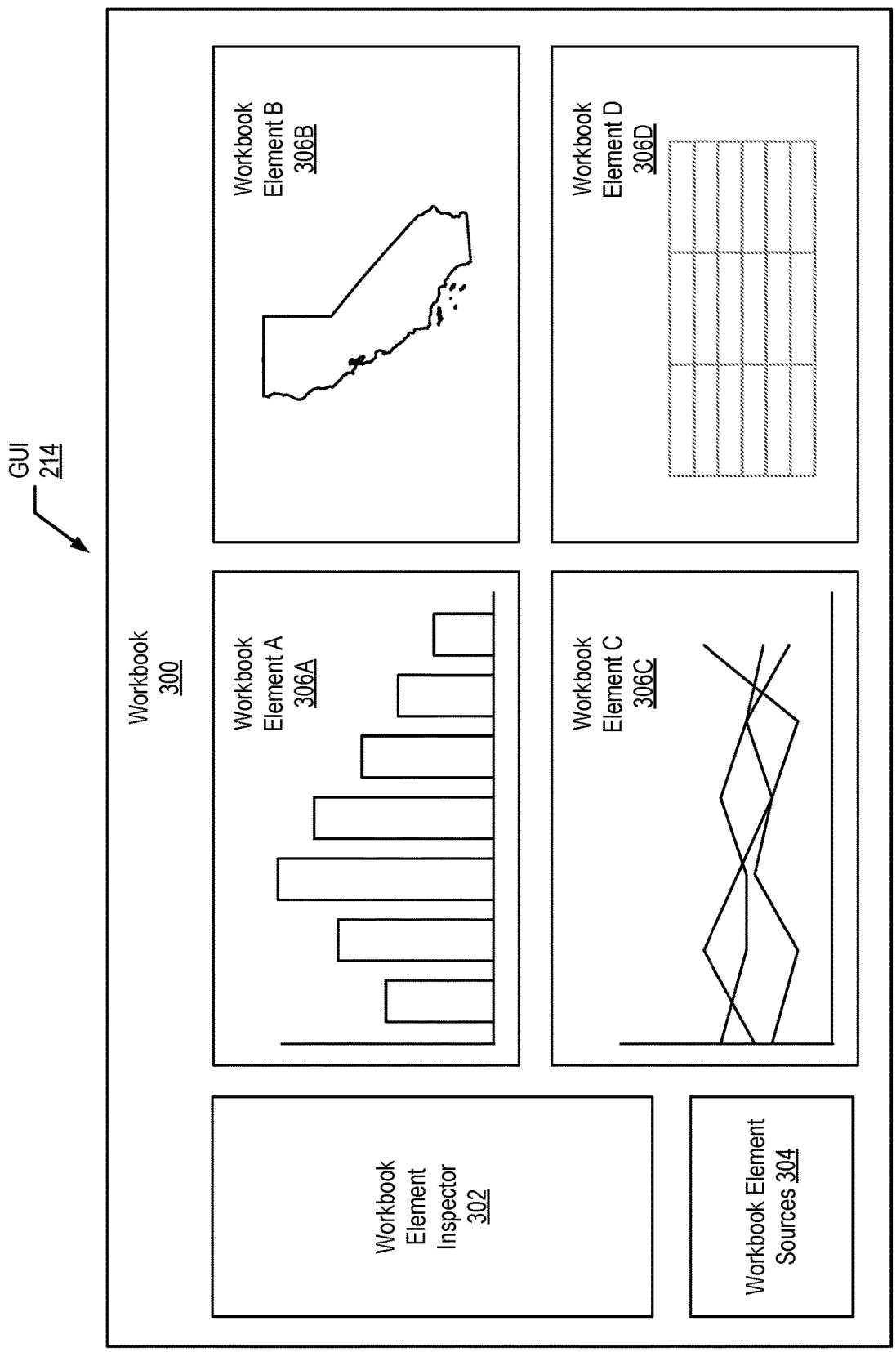
FIG. 3 sets forth a block diagram of an example system configured for cost attribution using resource switching according to embodiments of the present invention.

FIG. 3 shows an exemplary GUI for cost attribution using resource switching according to embodiments of the present invention. As shown in FIG. 3, the exemplary GUI 214 includes a workbook 300. The workbook 302 includes a workbook element inspector 302, workbook element sources 304, and four workbook elements (workbook element A 306A, workbook element B 306B, workbook element C 306C, workbook element D 306D).

The workbook 300 is a collection of graphical elements and organizing mechanism for a dataset. The workbook may present a dataset with data retrieved by the workbook manager from a cloud-based data warehouse. The dataset may then be organized based on the workbook metadata retrieved from the workbook repository. As shown in FIG. 3, the workbook 300 includes four workbook elements. Workbook element A 306A presents a bar graph, workbook element B 306B presents a map, workbook element C 306C presents a line graph, and workbook element D 306D presents a spreadsheet structure. Other types of workbook elements exist beyond the examples shown in FIG. 3. Some workbook elements (such as workbook element A 306A, workbook element B 306B, and workbook element C 306C) are visualizations. Visualizations are graphical element that convey relationships between data in the dataset. Visualizations may include, for example, graphs, charts, or maps. Spreadsheet structures are a presentation of a dataset (such as a table) from a database on a cloud-based data warehouse. The spreadsheet structure displays rows of data organized by columns. The columns delineate different categories of the data in each row. One or more columns may be calculation columns that include calculation results using other columns in the spreadsheet structure based on a formula received from the client. Both visualizations and the spreadsheet structures may include dynamic elements and be configured to interact with a client using the client computing system 204 via the GUI 214. Each workbook element (workbook element A 306A, workbook element B 306B, workbook element C 306C, workbook element D 306D) may use a dataset unique to that workbook element or use a dataset shared by at least one other workbook element.

The workbook element inspector 302 is a mechanism by which a user may configure each workbook element. Specifically, the workbook element inspector 302 allows a user to bind dimensions of the dataset to channels of the workbook element. A dimension of the dataset refers to a group of values, rows, or columns that share a characteristic. For example, a dimension may be all values in the dataset from a particular column, all rows in the dataset that share a value for a particular column, all columns in the dataset that share a value for a particular row, etc. A channel of the workbook element 304, 306 refers to aspect of the workbook element that is assignable to a dimension. Channels of a spreadsheet structure may include columns or rows (e.g., a column of the dataset may be bound to a particular column location within the visual presentation of the spreadsheet structure). Channels of visualizations may include, for example, x-axis, y-axis, or color. For example, a column of a dataset may be bound to the x-axis of a bar chart.

The workbook element inspector 302 may include a mechanism to define and organize hierarchical relationships between the columns of the of a spreadsheet structure. The term "hierarchical relationship" refers to subordinate and superior groupings of columns. For example, a database may include rows for an address book, and columns for state, county, city, and street. A dataset from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The workbook element sources 304 presents the user with the primary and any secondary sources (such as datasets) for the selected workbook element. The workbook element sources 304 may also include a mechanism for a user to request and configure a dataset from a database to be presented as a workbook element in a workbook 300. Such a mechanism may be part of the interactivity of the workbook 300. Specifically, a user may manipulate a workbook (e.g., by dragging and dropping columns or rows, resorting columns or rows, manipulating a graph etc.) and, in response, the GUI 214 may generate a request (e.g., in the form of a state specification) for a dataset and send the request to the workbook manager. Such a mechanism may also include a direct identification of the rows and columns of a database table that a user would like to access (e.g., via a selection of the rows and columns in a dialog box). The GUI 214 may also include a mechanism for a user to create a new table on the database, add rows to a table, and move rows within the table.

Figure 4:
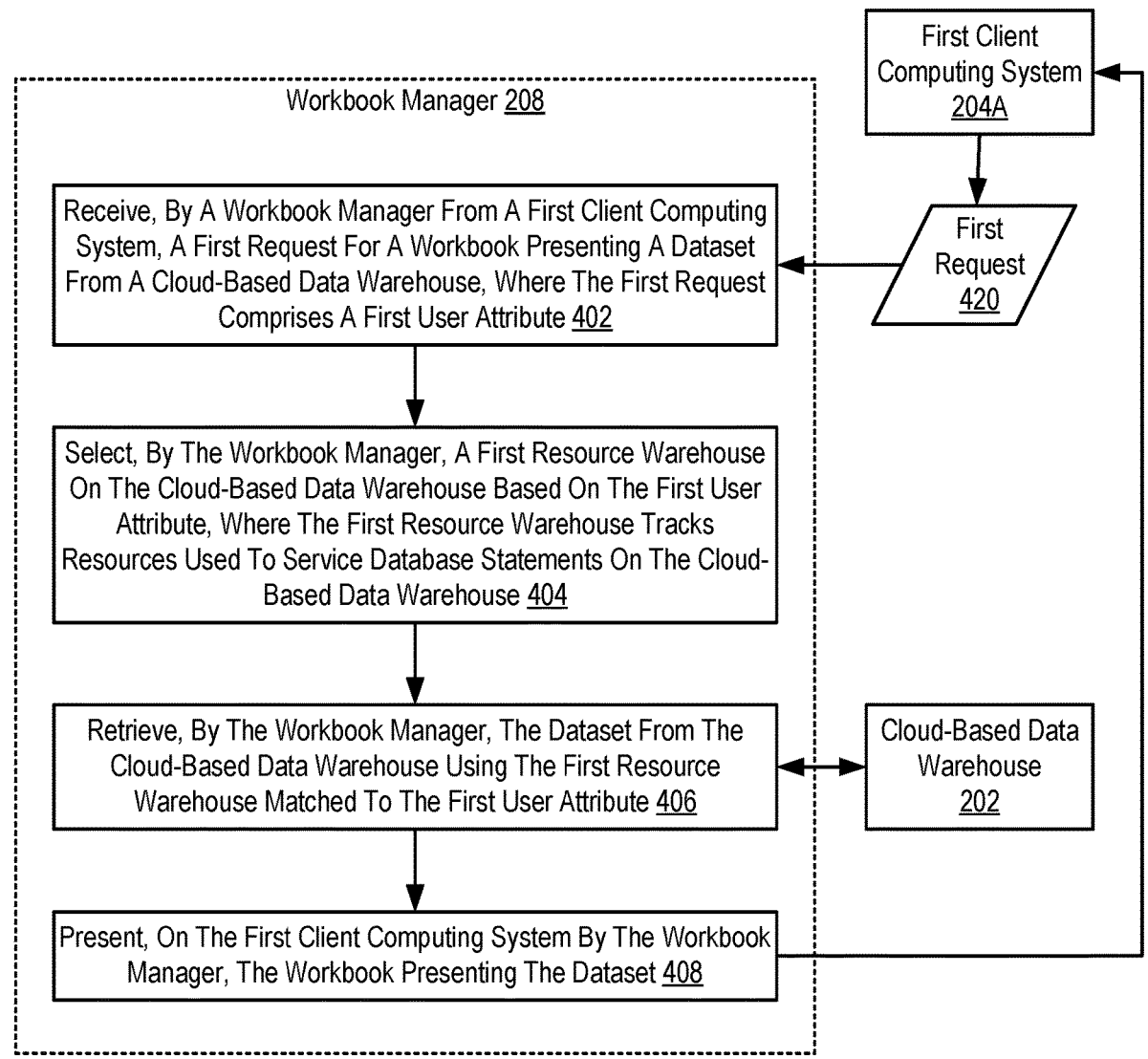
FIG. 4 sets forth a flow chart illustrating an exemplary method for cost attribution using resource switching according to embodiments of the present invention.

For further explanation, FIG. 4 sets forth a flow chart illustrating an exemplary method for cost attribution using resource switching according to embodiments of the present invention. The method of FIG. 4 includes receiving 402, by a workbook manager 208 from a first client computing system 204A, a first request 420 for a workbook presenting a dataset from a cloud-based data warehouse 202, wherein the first request 420 comprises a first user attribute. Receiving 402 the first request 420 for the workbook presenting a dataset from a cloud-based data warehouse 202 may be carried out by the workbook manager 208 receiving an indication that a user of the first client computing system 204A has selected the workbook for presentation. The first request 420 may be in the form of a state specification.

The workbook may present data gathered and stored by a data tenant of the cloud-based data warehouse 202 that is a separate entity from an organization associated with the user of the first client computing system 204A. The data tenant may create a workbook to provide users within the organization access to the data on the cloud-based data warehouse 202. As an example, a food delivery service "Deliver4U" may work with a number of different restaurants to deliver food from the restaurants to the restaurant's customers. Deliver4U may gather data about each restaurant, order, and customer and store that data in the cloud-based data warehouse 202. Deliver4U may create a workbook that allows each restaurant to view and analyze the data provided and controlled by Deliver4U.

The first request 420 for the workbook includes a first user attribute. A user attribute is an identifier of some aspect of the user of the client computing system 204A. For example, a user attribute may identify an organization associated with the user, such as an employer of the user. If the user attribute identifies an organization, the same user attribute may be used by a plurality of users on a plurality of client computing systems. As another example, a user attribute may uniquely identify the user, such as a user ID or email address. As yet another example, a user attribute may identify a context of the source of the request, such as the type of computing system, operating system, or application used to generate the request. Such user attributes may be automatically set by the application generating the request or be explicitly provided by the user.

A data tenant may store data relevant to multiple organizations together in the cloud-based data warehouse 202. Instead of creating a different workbook for each organization, the data tenant may create a single workbook that may be accessed by different and separate organizations. Different user attributes may be used by the workbook manager to select or filter different data from the dataset that populates the workbook with only data relevant to the particular organization. The user attributes may also be used to select a resource warehouse to service the data retrieval from the cloud-based data warehouse 202.

The first request may be generated in response to the user accessing a webpage with the workbook embedded therein. Specifically, the data tenant may provide a website portal that a user of the first client computing system 204A may access. Accessing the website portal generates the request for the workbook and any user attributes may be included in the request. Continuing with the example from above, Deliver4U may provide a website portal that allows each restaurant to access the workbook. When a restaurant employee accesses the website portal, a request is generated that includes user attributes that identify the restaurant, either generally (e.g., pizza) or uniquely (e.g., with a unique identifier of the restaurant). Instead of creating a different workbook for each restaurant, Deliver4U may embed the same workbook in the website portal but provide different user attributes (based on the restaurant) to the workbook manager in the request for the workbook. The user attributes may then be used by the workbook manager to select or filter different data from the dataset that populates the workbook with only data relevant to the particular restaurant. The resulting workbook may only display data about deliveries made by Deliver4U from the particular restaurant.

The method of FIG. 4 also includes selecting 404, by the workbook manager 208, a first resource warehouse on the cloud-based data warehouse 202 based on the first user attribute, wherein the first resource warehouse tracks resources used to service data requests on the cloud-based data warehouse 202. A resource warehouse is a mechanism to track the compute resources used to service data requests, such as database statements, on the cloud-based data warehouse 202. Each data request requires some amount of compute resources to fulfill. Such compute resources may include processing resources, memory resources, and networking resources on the cloud-based data warehouse 202. The compute resources are used to retrieve data and manipulate the data according to the data request. Using different resource warehouses, a single data tenant can track the compute resources used by different associated entities to access the data controlled by that data tenant. The resource warehouses may also be used to attribute the cost of those compute resources to the responsible entities.

Selecting 404 the first resource warehouse on the cloud-based data warehouse 202 based on the first user attribute may be carried out by using the first user attribute as a key into a data structure matching user attributes to resource warehouses. Specifically, the workbook manager 208 may maintain a data structure that maps user attributes to resource warehouse identifiers. The workbook manager 208 may use the user attribute to select the resource warehouse identifier mapped to that user attribute. Alternatively, the first user attribute may directly or indirectly identify the first data warehouse. If directly identified (e.g., the user attribute is the resource warehouse identifier), selecting 404 the first resource warehouse on the cloud-based data warehouse 202 based on the first user attribute may include adding the first user attribute to the data request for the dataset. If indirectly identified (e.g., the user attribute is some variation of the resource warehouse identifier), then the user attribute may be converted to the resource warehouse identifier by a predetermined method (e.g., the user attribute may be the first three letters of the resource warehouse and is converted by adding the remaining letters of the identifier).

The method of FIG. 4 also includes retrieving 406, by the workbook manager 208, the dataset from the cloud-based data warehouse 202 using the first resource warehouse matched to the first user attribute. Retrieving 406 the dataset from the cloud-based data warehouse 202 using the first resource warehouse may be carried out by generating the data request to the cloud-based data warehouse 202 and receiving the dataset in response. The data request may include a first resource warehouse identifier that identifies the selected first resource warehouse. The data request may also direct the cloud-based data warehouse to use the first resource warehouse to generate the reply containing the dataset.

The method of FIG. 4 also includes presenting 408, on the first client computing system 204A by the workbook manager 208, the workbook presenting the dataset. Presenting 408 the workbook on the first client computing system 204A may be carried out by organizing the dataset into the workbook and displaying the workbook on the GUI of the workbook client on the first client computing system 204A. If the workbook is embedded in a website, presenting 408 the workbook includes loading the workbook within the website on the first client computing system 204A.

Continuing with the example, Deliver4U may work with a wide variety of restaurants, including national chains and mom-and-pop diners. Because Deliver4U pays for the resources on the cloud-based data warehouse, Deliver4U may want to track the resources used by each restaurant's workbook requests. To that end, Deliver4U may associate each restaurant with a resource warehouse to audit the compute resources used by that restaurant. This association may be provided to the workbook manager 208 in the form of a data structure mapping a user attribute (e.g., restaurant name) to a particular resource warehouse.

Assume Deliver4U creates a website portal with an embedded workbook showing information about all deliveries made in 2022. Access to the website portal is provided to two customers: Pizza Bros., a national chain with dozens of restaurants, and Coffee Café, a single restaurant. Deliver4U instructs the workbook manager 208 to use resource warehouse A for Pizza Bros. and resource warehouse B for Coffee Café. As an employee of Pizza Bros. logs into the website portal provided by Deliver4U, a request is generated for the workbook that includes a user attribute identifying Pizza Bros. The workbook manager 208 receives the request, extracts the user attribute identifying Pizza Bros., and uses the user attribute to select resource warehouse A. The workbook manager then generates a data request instructing the cloud-based data warehouse to use resource warehouse A to retrieve the dataset for the workbook. In response, the workbook manager receives the dataset and organizes the dataset into the workbook. Finally, the workbook manager 208 presents the workbook to the employee of Pizza Bros. At the end of the month, Deliver4U accessed information on the cloud-based data warehouse regarding the compute resources used by resource warehouse A and resource warehouse B, and issues invoices to Pizza Bros. and Coffee Cafébased on the costs incurred according to resource warehouse A and resource warehouse B.

Figure 5:
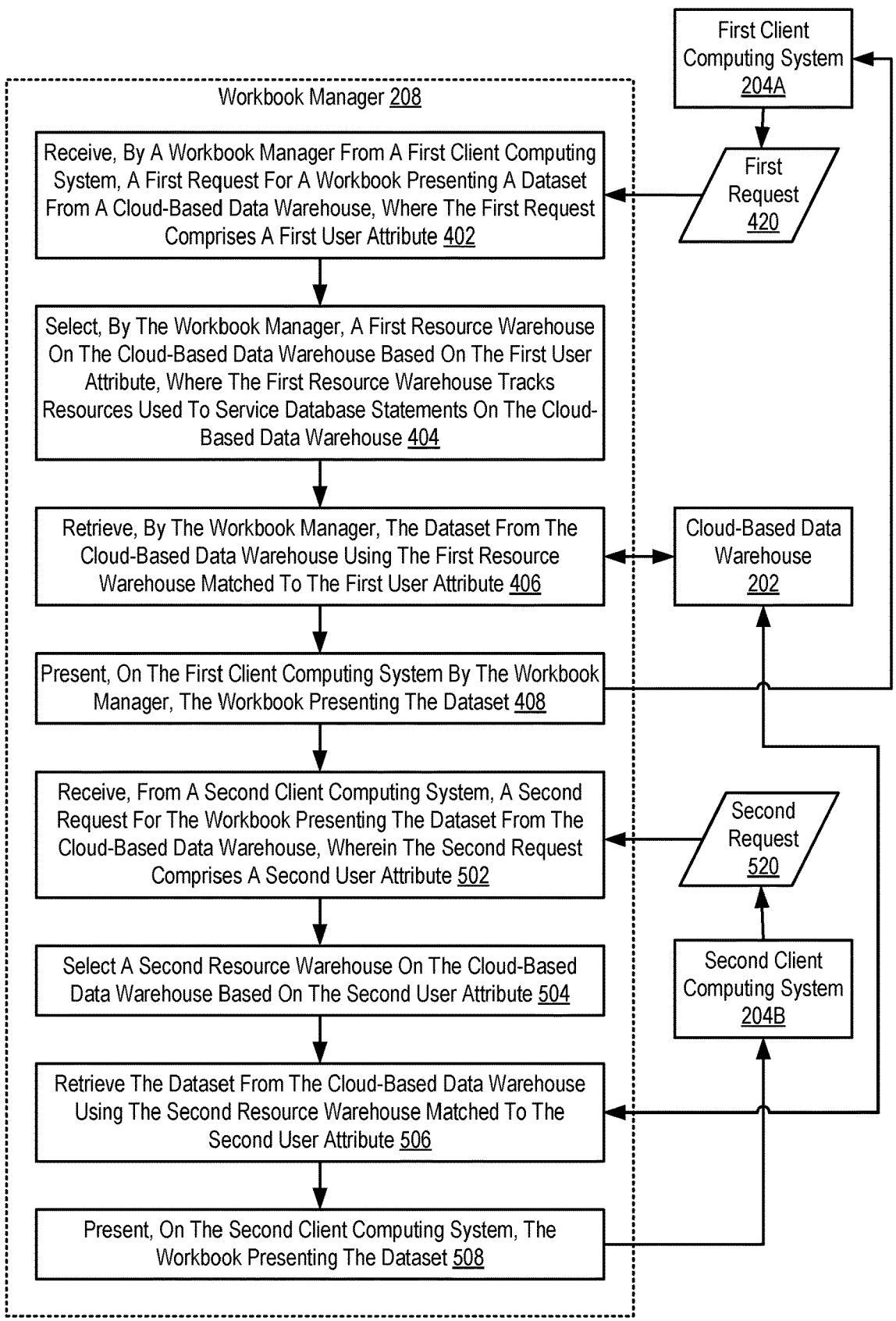
FIG. 5 sets forth a flow chart illustrating an exemplary method for cost attribution using resource switching according to embodiments of the present invention.

For further explanation, FIG. 5 sets forth a flow chart illustrating a further exemplary method for cost attribution using resource switching according to embodiments of the present invention that includes receiving 402, by a workbook manager 208 from a first client computing system 204A, a first request 420 for a workbook presenting a dataset from a cloud-based data warehouse 202, wherein the first request 420 comprises a first user attribute; selecting 404, by the workbook manager 208, a first resource warehouse on the cloud-based data warehouse 202 based on the first user attribute, wherein the first resource warehouse tracks resources used to service data requests on the cloud-based data warehouse 202; retrieving 406, by the workbook manager 208, the dataset from the cloud-based data warehouse 202 using the first resource warehouse matched to the first user attribute; and presenting 408, on the first client computing system 204A by the workbook manager 208, the workbook presenting the dataset.

The method of FIG. 5 differs from the method of FIG. 4, however, in that the method of FIG. 5 further includes receiving 502, from a second client computing system 204B, a second request 520 for the workbook presenting the dataset from the cloud-based data warehouse 202, wherein the second request 520 comprises a second user attribute. A user of the second client computing system 204B may be associated with a different organization than the user of the first client computing system 204A. However, the user of the second client computing system 204B may be attempting to access the same workbook created by the data tenant. The second request 520 will include different user attributes than the first request 420.

Receiving 502 the second request 520 for the workbook from a second client computing system 204B may be carried out by the workbook manager 208 receiving an indication that a user of the second client computing system 204B has selected the workbook for presentation on the second client computing system 204B. The second request 520 may be in the form of a state specification.

The second user attribute is a different user identifier than the first user attribute but may be the same type of user attribute. For example, the user attribute may identify an organization and the first user attribute may be a first organization (e.g., Pizza Bros.) and the second user attribute may be a second organization (e.g., Coffee Café).

The method of FIG. 5 further includes selecting 504 a second resource warehouse on the cloud-based data warehouse 202 based on the second user attribute. Selecting 504 the second resource warehouse on the cloud-based data warehouse 202 based on the second user attribute may be carried out by using the second user attribute as a key into the data structure matching user attributes to resource warehouses. Selecting 504 the second resource warehouse based on the second user attribute may also be carried out by converting the second user attribute into an identifier of the second resource warehouse if the second user attribute directly or indirectly identifies the second resource warehouse.

The method of FIG. 5 further includes retrieving 506 the dataset from the cloud-based data warehouse 202 using the second resource warehouse matched to the second user attribute. Retrieving 506 the dataset from the cloud-based data warehouse 202 using the second resource warehouse may be carried out by generating the data request to the cloud-based data warehouse 202 and receiving the dataset in response. The data request may include a second resource warehouse identifier that identifies the selected second resource warehouse. The data request may also direct the cloud-based data warehouse to use the second resource warehouse to generate the reply containing the dataset.

The dataset retrieved using the second resource warehouse may include different data from the cloud-based data warehouse selected based on the same second user attribute or other user attributes. For example, in addition to indicating to the workbook manager 208 to use the second resource warehouse, the second user attribute may also indicate to the workbook manager 208 to retrieve different data from the cloud-base data warehouse 202 for the dataset presented to the user of the second client computing system 204B. If the same dataset is retrieved for both the first request 420 and the second request 520, the dataset may be manipulated (e.g., filtered) by the workbook manager 208 to only present data relevant to the associated user. Alternatively, different datasets may be retrieved by the workbook manager (e.g., determined by user attributes received from the first client computing system 204A and second client computing system 204B).

The method of FIG. 5 further includes presenting 508, on the second client computing system 204B, the workbook presenting the dataset. Presenting 508, on the second client computing system 204B, the workbook presenting the dataset may be carried out by organizing the dataset into the workbook and displaying the workbook on the GUI of the workbook client on the second client computing system 204B. If the workbook is embedded in a website, presenting 508 the workbook includes loading the workbook within the website on the second client computing system 204B.

Figure 6:
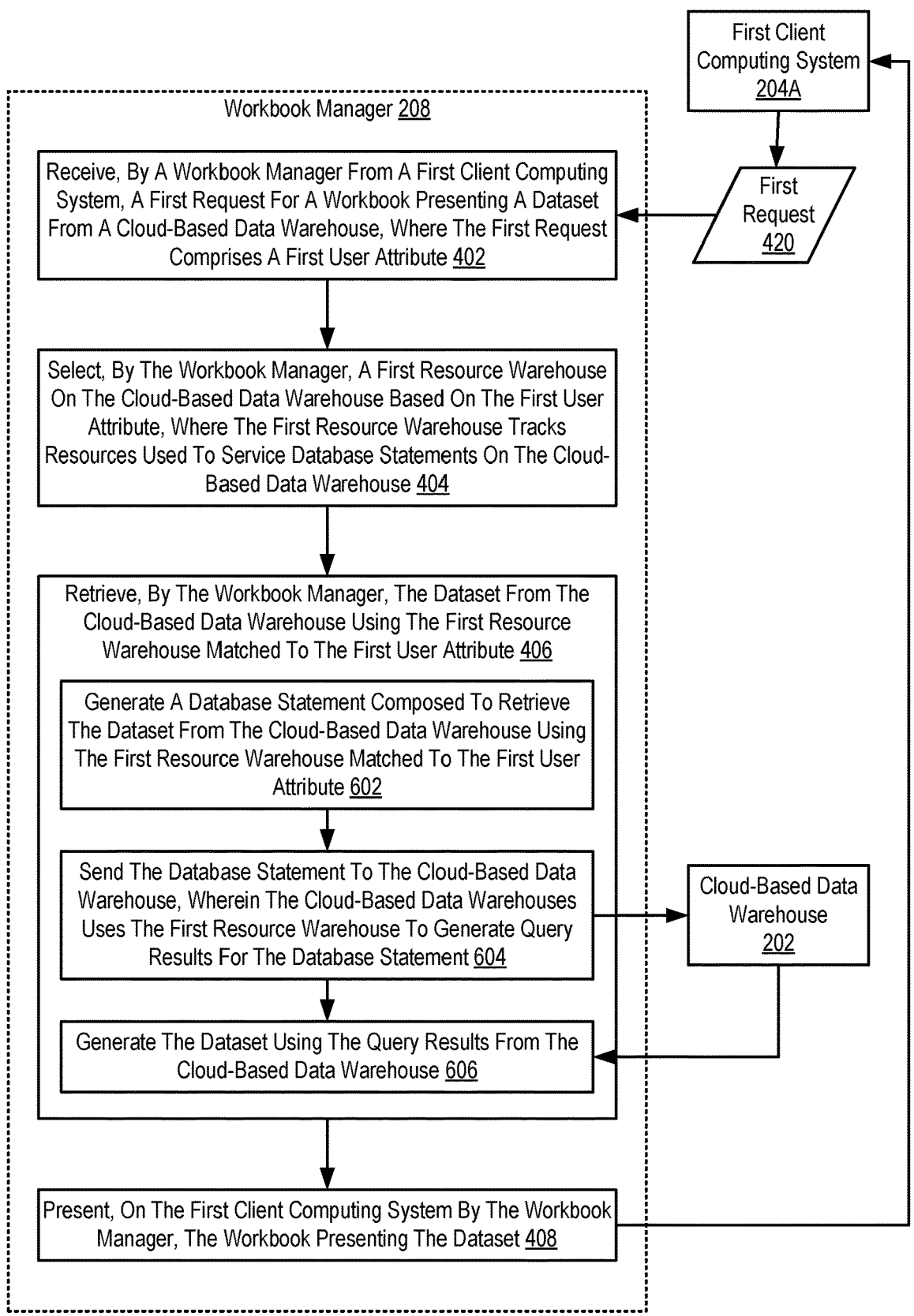
FIG. 6 sets forth a flow chart illustrating an exemplary method for cost attribution using resource switching according to embodiments of the present invention.

For further explanation, FIG. 6 sets forth a flow chart illustrating a further exemplary method for cost attribution using resource switching according to embodiments of the present invention that includes receiving 402, by a workbook manager 208 from a first client computing system 204A, a first request 420 for a workbook presenting a dataset from a cloud-based data warehouse 202, wherein the first request 420 comprises a first user attribute; selecting 404, by the workbook manager 208, a first resource warehouse on the cloud-based data warehouse 202 based on the first user attribute, wherein the first resource warehouse tracks resources used to service data requests on the cloud-based data warehouse 202; retrieving 406, by the workbook manager 208, the dataset from the cloud-based data warehouse 202 using the first resource warehouse matched to the first user attribute; and presenting 408, on the first client computing system 204A by the workbook manager 208, the workbook presenting the dataset.

The method of FIG. 6 differs from the method of FIG. 4, however, in that retrieving 406, by the workbook manager 208, the dataset from the cloud-based data warehouse 202 using the first resource warehouse matched to the first user attribute includes generating 602 a database statement composed to retrieve the dataset from the cloud-based data warehouse 202 using the first resource warehouse matched to the first user attribute; sending 604 the database statement to the cloud-based data warehouse 202, wherein the cloud-based data warehouses 202 uses the first resource warehouse to generate query results for the database statement; and generating 606 the dataset using the query results from the cloud-based data warehouse 202.

Generating 602 the database statement composed to retrieve the dataset from the cloud-based data warehouse 202 may be carried out by lowering the first request 420 into a database statement that includes an identifier of the first resource warehouse. The database statement may be a structured query language (SQL) statement. Sending 604 the database statement to the cloud-based data warehouse 202 may be carried out by issuing the database statement to the cloud-based data warehouse. Once received, the cloud-based data warehouse 202 uses the first resource warehouse to generate query results for the database statement. The cloud-based data warehouse 202 then attributes the compute resources used to generate the query results to the first resource warehouse. Generating 606 the dataset using the query results from the cloud-based data warehouse 202 may be carried out by extracting the dataset from the query results. Extracting the dataset from the query results may include filtering out extraneous data from the query results and organizing the query results according to the dataset.

In view of the explanations set forth above, readers will recognize that the benefits of cost attribution using resource switching according to embodiments of the present invention include:

Improving the operation of the computer system by tracking compute resource usage based on user attributes, increasing system utility.

Exemplary embodiments of the present invention are described largely in the context of a fully functional computer system for cost attribution using resource switching. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for cost attribution using resource switching, the method comprising:
   receiving, by a workbook manager from a first client computing system, a first request for a workbook presenting a dataset from a cloud-based data warehouse, wherein the first request comprises a first user attribute;
   selecting, by the workbook manager, a first resource warehouse on the cloud-based data warehouse based on the first user attribute, wherein the first resource warehouse tracks resources used to service data requests on the cloud-based data warehouse;
   retrieving, by the workbook manager, the dataset from the cloud-based data warehouse using the first resource warehouse matched to the first user attribute; and
   presenting, on the first client computing system by the workbook manager, the workbook presenting the dataset.

2. The method of claim 1, further comprising:
   receiving, from a second client computing system, a second request for the workbook presenting the dataset from the cloud-based data warehouse, wherein the second request comprises a second user attribute;
   selecting a second resource warehouse on the cloud-based data warehouse based on the second user attribute;
   retrieving the dataset from the cloud-based data warehouse using the second resource warehouse matched to the second user attribute; and
   presenting, on the second client computing system, the workbook presenting the dataset.

3. The method of claim 1, wherein the first user attribute indicates an association between a user of the first client computing system and an organization, and wherein the first resource warehouse tracks resources used by the organization to service data requests on the cloud-based data warehouse.

4. The method of claim 1, wherein retrieving the dataset from the cloud-based data warehouse using the first resource warehouse comprises:
   generating a database statement composed to retrieve the dataset from the cloud-based data warehouse using the first resource warehouse matched to the first user attribute;
   sending the database statement to the cloud-based data warehouse, wherein the cloud-based data warehouses uses the first resource warehouse to generate query results for the database statement; and
   generating the dataset using the query results from the cloud-based data warehouse.

5. The method of claim 4, wherein the database statement comprises an identifier of the first resource warehouse.

6. The method of claim 4, wherein the database statement is a structured query language statement.

7. The method of claim 1, wherein selecting the first resource warehouse on the cloud-based data warehouse based on the first user attribute comprises using the first user attribute as a key into a data structure matching user attributes to resource warehouses.

8. The method of claim 1, wherein the first user attribute is set by an application on the first client computing system embedding the workbook.

9. The method of claim 1, wherein the first user attribute is used by a plurality of users on a plurality of client computing systems.

10. The method of claim 1, wherein the workbook manager is on an intermediary computing system between the first client computing system and the cloud-based data warehouse.

11. An apparatus for cost attribution using resource switching, the apparatus comprising a computer processor, a computer memory operatively coupled to the computer processor, the computer memory having disposed within it computer program instructions that, when executed by the computer processor, cause the apparatus to carry out the steps of:
   receiving, from a first client computing system, a first request for a workbook presenting a dataset from a cloud-based data warehouse, wherein the first request comprises a first user attribute;
   selecting a first resource warehouse on the cloud-based data warehouse based on the first user attribute, wherein the first resource warehouse tracks resources used to service data requests on the cloud-based data warehouse;
   retrieving the dataset from the cloud-based data warehouse using the first resource warehouse matched to the first user attribute; and
   presenting, on the first client computing system, the workbook presenting the dataset.

12. The apparatus of claim 11, wherein the computer program instructions further cause the apparatus to carry out the step of:
   receiving, from a second client computing system, a second request for the workbook presenting the dataset from the cloud-based data warehouse, wherein the second request comprises a second user attribute;
   selecting a second resource warehouse on the cloud-based data warehouse based on the second user attribute;
   retrieving the dataset from the cloud-based data warehouse using the second resource warehouse matched to the second user attribute; and
   presenting, on the second client computing system, the workbook presenting the dataset.

13. The apparatus of claim 11, wherein the first user attribute indicates an association between a user of the first client computing system and an organization, and wherein the first resource warehouse tracks resources used by the organization to service data requests on the cloud-based data warehouse.

14. The apparatus of claim 11, wherein retrieving the dataset from the cloud-based data warehouse using the first resource warehouse comprises:
    generating a database statement composed to retrieve the dataset from the cloud-based data warehouse using the first resource warehouse matched to the first user attribute;
    sending the database statement to the cloud-based data warehouse, wherein the cloud-based data warehouses uses the first resource warehouse to generate query results for the database statement; and
    generating the dataset using the query results from the cloud-based data warehouse.

15. The apparatus of claim 14, wherein the database statement comprises an identifier of the first resource warehouse.

16. The apparatus of claim 14, wherein the database statement is a structured query language statement.

17. The apparatus of claim 11, wherein selecting the first resource warehouse on the cloud-based data warehouse based on the first user attribute comprises using the first user attribute as a key into a data structure matching user attributes to resource warehouses.

18. The apparatus of claim 11, wherein the first user attribute is set by an application on the first client computing system embedding the workbook.

19. The apparatus of claim 11, wherein the first user attribute is used by a plurality of users on a plurality of client computing systems.

20. A computer program product for cost attribution using resource switching, the computer program product disposed upon a non-transitory computer readable medium, the computer program product comprising computer program instructions that, when executed, cause a computer to carry out the steps of:
    receiving, from a first client computing system, a first request for a workbook presenting a dataset from a cloud-based data warehouse, wherein the first request comprises a first user attribute;
    selecting a first resource warehouse on the cloud-based data warehouse based on the first user attribute, wherein the first resource warehouse tracks resources used to service data requests on the cloud-based data warehouse;
    retrieving the dataset from the cloud-based data warehouse using the first resource warehouse matched to the first user attribute; and
    presenting, on the first client computing system, the workbook presenting the dataset.

* * * * *